US006324503B1

(12) United States Patent
Manjunath et al.

(10) Patent No.: US 6,324,503 B1
(45) Date of Patent: Nov. 27, 2001

(54) METHOD AND APPARATUS FOR PROVIDING FEEDBACK FROM DECODER TO ENCODER TO IMPROVE PERFORMANCE IN A PREDICTIVE SPEECH CODER UNDER FRAME ERASURE CONDITIONS

(75) Inventors: Sharath Manjunath; Andrew P. Dejaco, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/356,860

(22) Filed: Jul. 19, 1999

(51) Int. Cl.[7] .......................... G10L 21/02; G10L 11/02; G06F 15/00

(52) U.S. Cl. ......................... 704/226; 704/201; 704/200; 704/270

(58) Field of Search .................................... 704/226, 201, 704/230, 235, 260, 275, 220, 219

(56) References Cited

U.S. PATENT DOCUMENTS

| | | | | |
|---|---|---|---|---|
| 4,410,986 | * | 10/1983 | Corwin | 704/226 |
| 4,901,307 | * | 2/1990 | Gilhousen et al. | 704/201 |
| 5,103,459 | | 4/1992 | Gilhousen et al. | 375/1 |
| 5,414,796 | | 5/1995 | Jacobs et al. | 395/2.3 |
| 5,488,663 | * | 1/1996 | Dewolf et al. | 704/201 |
| 5,727,123 | | 3/1998 | McDonough et al. | 395/2.33 |
| 5,768,527 | | 6/1998 | Zhu et al. . | |
| 5,911,128 | | 6/1999 | DeJaco | 704/221 |

FOREIGN PATENT DOCUMENTS

| | | |
|---|---|---|
| 9622639 | 7/1996 | (WO) . |
| 9952224 | 10/1999 | (WO) . |

OTHER PUBLICATIONS

Kubin et al ("Multiple–Description Coding (MDC) of Speech with an Invertible Auditory Model," 1999 IEEE Workshop on Speech Coding Proceedings, Jun. 1999).*

Driessen ("Performance of Frame Synchronization in Packet Transmission using Bit Erasure Information," IEEE Transactions on Communications, Apr. 1991).*

1978 Digital Processing of Speech Signals, "Linear Predictive Coding of Speech", L.R. Rabiner et al., pp. 396–453.

* cited by examiner

*Primary Examiner*—Richemond Dorvil
*Assistant Examiner*—Daniel A. Nolan
(74) *Attorney, Agent, or Firm*—Philip Wadsworth; Kent D. Baker; Thomas R. Rouse

(57) ABSTRACT

A method and apparatus for providing feedback from the decoder to the encoder to improve performance in a predictive speech coder under frame erasure conditions includes notifying an encoder in a receiving speech coder if a decoder in the receiving speech coder fails to receive a frame transmitted by an encoder in a transmitting speech coder. A modified packet is transmitted from the encoder in the receiving speech coder to a decoder in the transmitting speech coder in response to the notification. The decoder in the transmitting speech coder notifies the encoder in the transmitting speech coder when the modified packet is received. The encoder in the transmitting speech coder then encodes a packet with a modified encoding format. The modified encoding format may be either a low-memory encoding format or a memoryless encoding format. The modified packet may have an erasure indicator bit set to a digital value of one.

18 Claims, 6 Drawing Sheets

METHOD AND APPARATUS FOR PROVIDING FEEDBACK FROM DECODER TO ENCODER TO IMPROVE PERFORMANCE IN A PREDICTIVE SPEECH CODER UNDER FRAME ERASURE CONDITIONS

BACKGROUND OF THE INVENTION

I. Field of the Invention

The present invention pertains generally to the field of speech processing, and more specifically to methods and apparatus for providing feedback from the decoder to the collocated encoder to improve performance in predictive speech coders under frame erasure conditions.

II. Background

Transmission of voice by digital techniques has become widespread, particularly in long distance and digital radio telephone applications. This, in turn, has created interest in determining the least amount of information that can be sent over a channel while maintaining the perceived quality of the reconstructed speech. If speech is transmitted by simply sampling and digitizing, a data rate on the order of sixty-four kilobits per second (kbps) is required to achieve a speech quality of conventional analog telephone. However, through the use of speech analysis, followed by the appropriate coding, transmission, and resynthesis at the receiver, a significant reduction in the data rate can be achieved.

Devices for compressing speech find use in many fields of telecommunications. An exemplary field is wireless communications. The field of wireless communications has many applications including, e.g., cordless telephones, paging, wireless local loops, wireless telephony such as cellular and PCS telephone systems, mobile Internet Protocol (IP) telephony, and satellite communication systems. A particularly important application is wireless telephony for mobile subscribers.

Various over-the-air interfaces have been developed for wireless communication systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile Communications (GSM), and Interim Standard 95 (IS-95). An exemplary wireless telephony communication system is a code division multiple access (CDMA) system. The IS-95 standard and its derivatives, IS-95A, ANSI J-STD-008, IS-95B, proposed third generation standards IS-95C and IS-2000, etc. (referred to collectively herein as IS-95), are promulgated by the Telecommunication Industry Association (TIA) and other well known standards bodies to specify the use of a CDMA over-the-air interface for cellular or PCS telephony communication systems. Exemplary wireless communication systems configured substantially in accordance with the use of the IS-95 standard are described in U.S. Pat. Nos. 5,103,459 and 4,901,307, which are assigned to the assignee of the present invention and fully incorporated herein by reference.

Devices that employ techniques to compress speech by extracting parameters that relate to a model of human speech generation are called speech coders. A speech coder divides the incoming speech signal into blocks of time, or analysis frames. Speech coders typically comprise an encoder and a decoder. The encoder analyzes the incoming speech frame to extract certain relevant parameters, and then quantizes the parameters into binary representation, i.e., to a set of bits or a binary data packet. The data packets are transmitted over the communication channel to a receiver and a decoder. The decoder processes the data packets, unquantizes them to produce the parameters, and resynthesizes the speech frames using the unquantized parameters.

The function of the speech coder is to compress the digitized speech signal into a low-bit-rate signal by removing all of the natural redundancies inherent in speech. The digital compression is achieved by representing the input speech frame with a set of parameters and employing quantization to represent the parameters with a set of bits. If the input speech frame has a number of bits $N_i$ and the data packet produced by the speech coder has a number of bits $N_o$, the compression factor achieved by the speech coder is $C_r=N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Perhaps most important in the design of a speech coder is the search for a good set of parameters (including vectors) to describe the speech signal. A good set of parameters requires a low system bandwidth for the reconstruction of a perceptually accurate speech signal. Pitch, signal power, spectral envelope (or formants), amplitude and phase spectra are examples of the speech coding parameters.

Speech coders may be implemented as time-domain coders, which attempt to capture the time-domain speech waveform by employing high time-resolution processing to encode small segments of speech (typically 5 millisecond (ms) subframes) at a time. For each subframe, a high-precision representative from a codebook space is found by means of various search algorithms known in the art. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques described in A. Gersho & R. M. Gray, *Vector Quantization and Signal Compression* (1992).

A well-known time-domain speech coder is the Code Excited Linear Predictive (CELP) coder described in L. B. Rabiner & R. W. Schafer, *Digital Processing of Speech Signals* 396–453 (1978), which is fully incorporated herein by reference. In a CELP coder, the short term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding the LP short-term filter coefficients and encoding the LP residue. Time-domain coding can be performed at a fixed rate (i.e., using the same number of bits, $N_o$, for each frame) or at a variable rate (in which different bit rates are used for different types of frame contents). Variable-rate coders attempt to use only the amount of bits needed to encode the codec parameters to a level adequate to obtain a target quality. An exemplary variable rate CELP coder is described in U.S. Pat. No. 5,414,796, which is assigned to the assignee of the present invention and fully incorporated herein by reference.

Time-domain coders such as the CELP coder typically rely upon a high number of bits, $N_o$, per frame to preserve the accuracy of the time-domain speech waveform. Such coders typically deliver excellent voice quality provided the number of bits, $N_o$, per frame relatively large (e.g., 8 kbps or above). However, at low bit rates (4 kbps and below), time-domain coders fail to retain high quality and robust performance due to the limited number of available bits. At low bit rates, the limited codebook space clips the waveform-matching capability of conventional time-domain coders, which are so successfully deployed in higher-rate commercial applications. Hence, despite improvements over time, many CELP coding systems operating at low bit rates suffer from perceptually significant distortion typically characterized as noise.

There is presently a surge of research interest and strong commercial need to develop a high-quality speech coder operating at medium to low bit rates (i.e., in the range of 2.4 to 4 kbps and below). The application areas include wireless telephony, satellite communications, Internet telephony, various multimedia and voice-streaming applications, voice mail, and other voice storage systems. The driving forces are the need for high capacity and the demand for robust performance under packet loss situations. Various recent speech coding standardization efforts are another direct driving force propelling research and development of low-rate speech coding algorithms. A low-rate speech coder creates more channels, or users, per allowable application bandwidth, and a low-rate speech coder coupled with an additional layer of suitable channel coding can fit the overall bit-budget of coder specifications and deliver a robust performance under channel error conditions.

Conventional low-to-medium-bit-rate, predictive speech coders tend to perform poorly under poor channel conditions, which cause frame erasures. The predictive nature of the speech coder dictates that frames received subsequent to a frame erasure (i.e., a frame that was lost in transmission and was hence not received) will be synthesized on the basis of bad prior information, and the decoder will lose synchrony with the associated encoder. The synthesized frames will therefore degrade, and voice quality will suffer. It would be desirable, therefore, to improve the performance of a speech coder under poor channel conditions. Thus, there is a need for a speech coder that uses a feedback mechanism to improve performance under frame erasure conditions.

SUMMARY OF THE INVENTION

The present invention is directed to a speech coder that uses a feedback mechanism to improve performance under frame erasure conditions. Accordingly, in one aspect of the invention, a speech coding system advantageously includes a first speech coder including a first encoder and a first decoder; and a second speech coder including a second encoder and a second decoder, wherein the first encoder is configured to encode packets of speech frames and transmit the packets across a communication channel to the second decoder, the second decoder is configured to receive and decode packets and to send a signal to the second encoder if a transmitted frame is not received by the second decoder, the second encoder is configured to encode and transmit packets and to modify a packet in response to the signal from the second decoder, the first decoder is configured to receive and decode packets and to send a signal to the first encoder upon receiving a modified packet from the second encoder, and the first encoder is further configured to encode a packet using a modified encoding format in response to the signal from the first decoder.

In another aspect of the invention, a method of providing feedback from a first decoder in a first speech coder to a first encoder in a second speech coder, advantageously includes the steps of notifying a second encoder in the first speech coder if the first decoder fails to receive a frame transmitted by the first encoder; transmitting a modified packet from the second encoder to the second decoder in response to the notification; notifying the first encoder when the second decoder receives the modified packet from the second encoder; and encoding a packet at the first encoder with a modified encoding format.

In another aspect of the invention, a feedback mechanism in a speech coding system, the speech coding system including first and second speech coders, the first speech coder including a first encoder and a first decoder, the second speech coder including a second encoder and a second decoder, advantageously includes means for notifying the second encoder if the second decoder fails to receive a frame transmitted by the first encoder; means for transmitting a modified packet from the second encoder to the first decoder in response to the notification; means for notifying the first encoder when the first decoder receives the modified packet from the second encoder; and means for encoding a packet at the first encoder with a modified encoding format.

DETAILED DESCRIPTION OF THE PREFERRED EMBODIMENTS

The exemplary embodiments described hereinbelow reside in a wireless telephony communication system configured to employ a CDMA over-the-air interface. Nevertheless, it would be understood by those skilled in the art that a subsampling method and apparatus embodying features of the instant invention may reside in any of various communication systems employing a wide range of technologies known to those of skill in the art.

Figure 1:
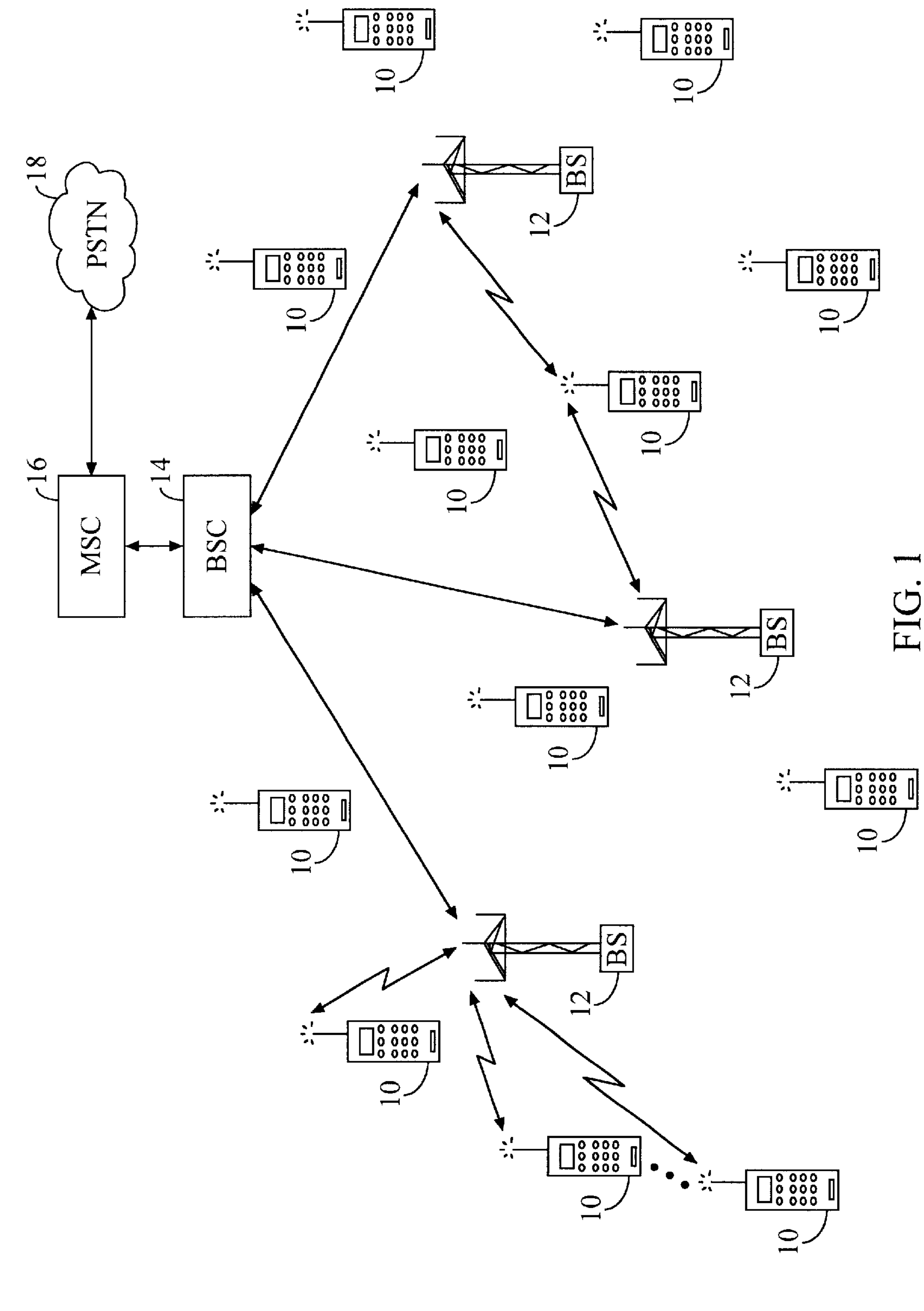
FIG. 1 PRIOR ART
FIG. 1 is a block diagram of a wireless telephone system.

As illustrated in FIG. 1, a CDMA wireless telephone system generally includes a plurality of mobile subscriber units 10, a plurality of base stations 12, base station controllers (BSCs) 14, and a mobile switching center (MSC) 16.

The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured to support any of several known interfaces including, e.g., E1/T1, ATM, IP, PPP, Frame Relay, HDSL, ADSL, or xDSL. It is understood that there may be more than two BSCs 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. Alternatively, individual sectors of a given BTS 12 may be referred to as cell sites. The mobile subscriber units 10 are typically cellular or PCS telephones 10. The system is advantageously configured for use in accordance with the IS-95 standard.

During typical operation of the cellular telephone system, the base stations 12 receive sets of reverse link signals from sets of mobile units 10. The mobile units 10 are conducting telephone calls or other communications. Each reverse link signal received by a given base station 12 is processed within that base station 12. The resulting data is forwarded to the BSCs 14. The BSCs 14 provides call resource allocation and mobility management functionality including the orchestration of soft handoffs between base stations 12. The BSCs 14 also routes the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward link signals to sets of mobile units 10.

Figure 2:
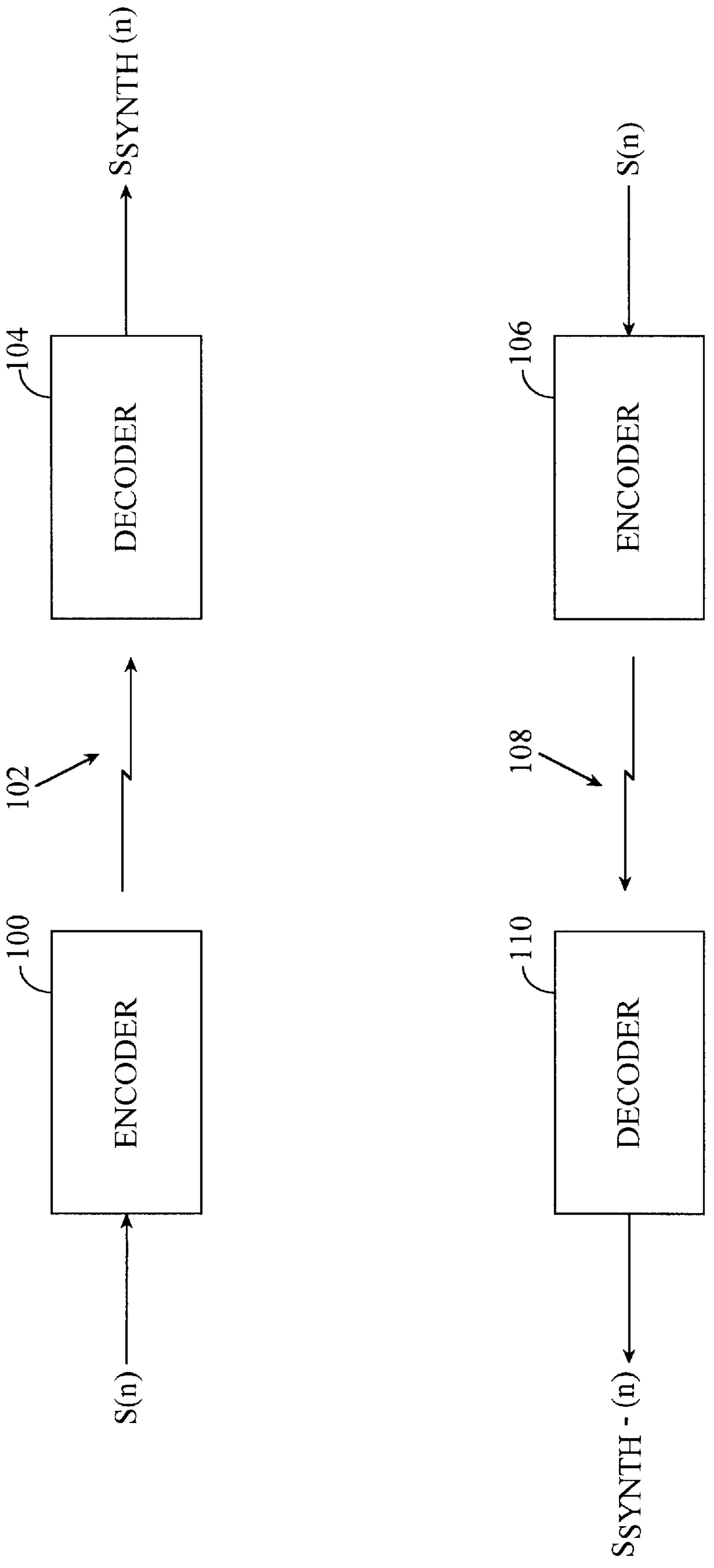
FIG. 2 PRIOR ART
FIG. 2 is a block diagram of a communication channel terminated at each end by speech coders.

In FIG. 2 a first encoder 100 receives digitized speech samples s(n) and encodes the samples s(n) for transmission on a transmission medium 102, or communication channel 102, to a first decoder 104. The decoder 104 decodes the encoded speech samples and synthesizes an output speech signal $s_{SYNTH}(n)$. For transmission in the opposite direction, a second encoder 106 encodes digitized speech samples s(n), which are transmitted on a communication channel 108. A second decoder 110 receives and decodes the encoded speech samples, generating a synthesized output speech signal $s_{SYNTH}(n)$.

The speech samples s(n) represent speech signals that have been digitized and quantized in accordance with any of various methods known in the art including, e.g., pulse code modulation (PCM), companded $\mu$-law, or A-law. As known in the art, the speech samples s(n) are organized into frames of input data wherein each frame comprises a predetermined number of digitized speech samples s(n). In an exemplary embodiment, a sampling rate of 8 kHz is employed, with each 20 ms frame comprising 160 samples. In the embodiments described below, the rate of data transmission may advantageously be varied on a frame-to-frame basis from 13.2 kbps (full rate) to 6.2 kbps (half rate) to 2.6 kbps (quarter rate) to 1 kbps (eighth rate). Varying the data transmission rate is advantageous because lower bit rates may be selectively employed for frames containing relatively less speech information. As understood by those skilled in the art, other sampling rates, frame sizes, and data transmission rates may be used.

The first encoder 100 and the second decoder 110 together comprise a first speech coder, or speech codec. The speech coder could be used in any communication device for transmitting speech signals, including, e.g., the subscriber units, BTSs, or BSCs described above with reference to FIG. 1. Similarly, the second encoder 106 and the first decoder 104 together comprise a second speech coder. It is understood by those of skill in the art that speech coders may be implemented with a digital signal processor (DSP), an application-specific integrated circuit (ASIC), discrete gate logic, firmware, or any conventional programmable software module and a microprocessor. The software module could reside in RAM memory, flash memory, registers, or any other form of writable storage medium known in the art. Alternatively, any conventional processor, controller, or state machine could be substituted for the microprocessor. Exemplary ASICs designed specifically for speech coding are described in U.S. Pat. No. 5,727,123, assigned to the assignee of the present invention and fully incorporated herein by reference, and U.S. Pat. No. 5,784,532, entitled VOCODER ASIC, issued Jul. 28, 1998, assigned to the assignee of the present invention, and fully incorporated herein by reference.

Figure 3:
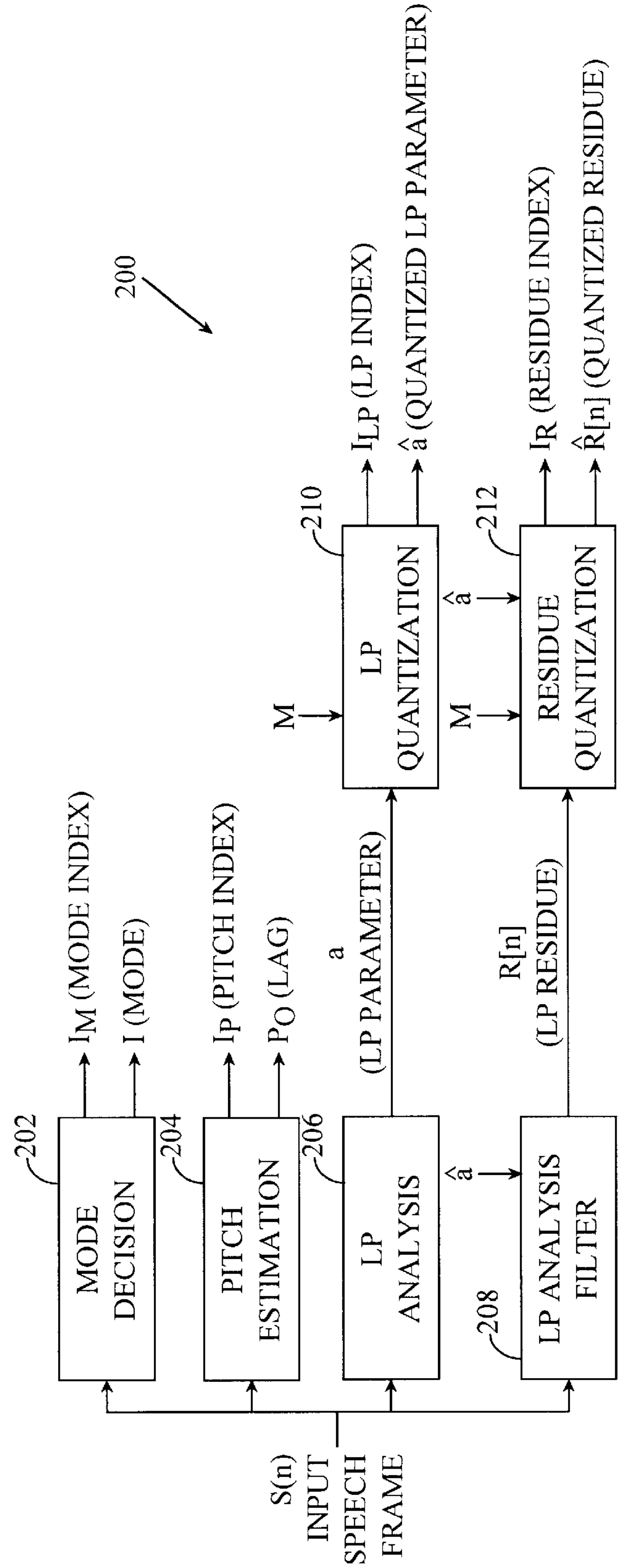
FIG. 3 PRIOR ART
FIG. 3 is a block diagram of an encoder.

In FIG. 3 an encoder 200 that may be used in a speech coder includes a mode decision module 202, a pitch estimation module 204, an LP analysis module 206, an LP analysis filter 208, an LP quantization module 210, and a residue quantization module 212. Input speech frames s(n) are provided to the mode decision module 202, the pitch estimation module 204, the LP analysis module 206, and the LP analysis filter 208. The mode decision module 202 produces a mode index $I_M$ and a mode M based upon the periodicity, energy, signal-to-noise ratio (SNR), or zero crossing rate, among other features, of each input speech frame s(n). Various methods of classifying speech frames according to periodicity are described in U.S. Pat. No. 5,911,128, which is assigned to the assignee of the present invention and fully incorporated herein by reference. Such methods are also incorporated into the Telecommunication Industry Association Industry Interim Standards TIA/EIA IS-127 and TIA/EIA IS-733. An exemplary mode decision scheme is also described in U.S. application Ser. No. 09/217,341, entitled VARAIBLE RATE SPEECH CODING, filed Dec. 21, 1998, assigned to the assignee of the present invention, and fully incorporated herein by reference.

The pitch estimation module 204 produces a pitch index $I_P$, and a lag value $P_0$ based upon each input speech frame s(n). The LP analysis module 206 performs linear predictive analysis on each input speech frame s(n) to generate an LP parameter a. The LP parameter a is provided to the LP quantization module 210. The LP quantization module 210 also receives the mode M, thereby performing the quantization process in a mode-dependent manner. The LP quantization module 210 produces an LP index $I_{LP}$ and a quantized LP parameter $\hat{a}$. The LP analysis filter 208 receives the quantized LP parameter $\hat{a}$ in addition to the input speech frame s(n). The LP analysis filter 208 generates an LP residue signal R[n], which represents the error between the input speech frames s(n) and the reconstructed speech based on the quantized linear predicted parameters $\hat{a}$. The LP residue R[n], the mode M, and the quantized LP parameter $\hat{a}$ are provided to the residue quantization module 212. Based upon these values, the residue quantization module 212 produces a residue index $I_R$ and a quantized residue signal $\hat{R}[n]$.

Figure 4:
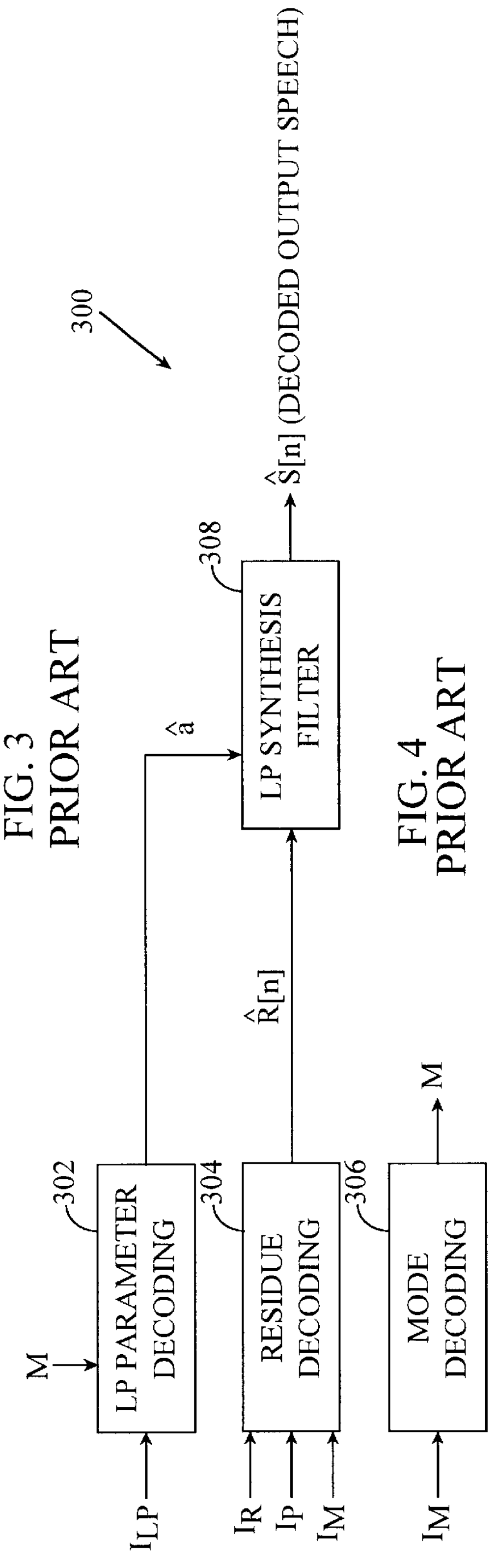
FIG. 4 PRIOR ART
FIG. 4 is a block diagram of a decoder.

In FIG. 4 a decoder 300 that may be used in a speech coder includes an LP parameter decoding module 302, a residue decoding module 304, a mode decoding module 306, and an LP synthesis filter 308. The mode decoding module 306 receives and decodes a mode index $I_M$, generating therefrom a mode M. The LP parameter decoding module 302 receives the mode M and an LP index $I_{LP}$. The LP parameter decoding module 302 decodes the received values to produce a quantized LP parameter $\hat{a}$. The residue decoding module 304 receives a residue index $I_R$, a pitch index $I_P$, and the mode index $I_M$. The residue decoding module 304 decodes the received values to generate a quantized residue signal $\hat{R}[n]$. The quantized residue signal $\hat{R}[n]$ and the quantized LP parameter $\hat{a}$ are provided to the LP synthesis filter 308, which synthesizes a decoded output speech signal $\hat{s}[n]$ therefrom.

Operation and implementation of the various modules of the encoder 200 of FIG. 3 and the decoder 300 of FIG. 4 are known in the art and described in the aforementioned U.S. Pat. No. 5,414,796 and L. B. Rabiner & R. W. Schafer, *Digital Processing of Speech Signals* 396–453 (1978).

Figure 5:
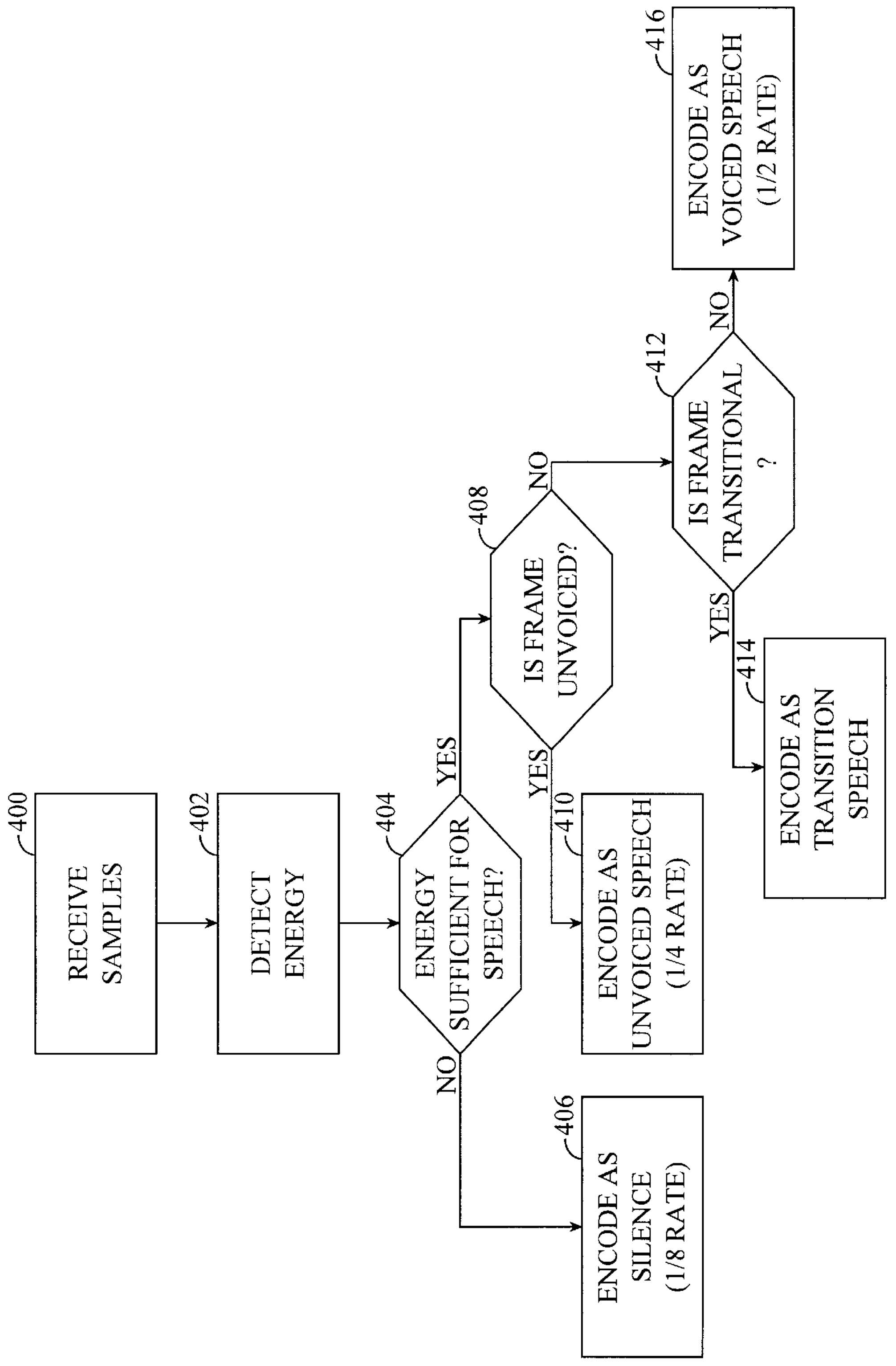
FIG. 5 PRIOR ART
FIG. 5 is a flow chart illustrating a speech coding decision process.

As illustrated in the flow chart of FIG. 5, a speech coder in accordance with one embodiment follows a set of steps in processing speech samples for transmission. In step 400 the speech coder receives digital samples of a speech signal in successive frames. Upon receiving a given frame, the speech coder proceeds to step 402. In step 402 the speech coder detects the energy of the frame. The energy is a measure of the speech activity of the frame. Speech detection is performed by summing the squares of the amplitudes of the digitized speech samples and comparing the resultant energy against a threshold value. In one embodiment the threshold value adapts based on the changing level of background noise. An exemplary variable threshold speech activity detector is described in the aforementioned U.S. Pat. No. 5,414,796. Some unvoiced speech sounds can be extremely low-energy samples that may be mistakenly encoded as background noise. To prevent this from occurring, the spectral tilt of low-energy samples may be used to distinguish the unvoiced speech from background noise, as described in the aforementioned U.S. Pat. No. 5,414,796.

After detecting the energy of the frame, the speech coder proceeds to step 404. In step 404 the speech coder determines whether the detected frame energy is sufficient to classify the frame as containing speech information. If the detected frame energy falls below a predefined threshold level, the speech coder proceeds to step 406. In step 406 the speech coder encodes the frame as background noise (i.e., nonspeech, or silence). In one embodiment the background noise frame is encoded at ⅛ rate, or 1 kbps. If in step 404 the detected frame energy meets or exceeds the predefined threshold level, the frame is classified as speech and the speech coder proceeds to step 408.

In step 408 the speech coder determines whether the frame is unvoiced speech, i.e., the speech coder examines the periodicity of the frame. Various known methods of periodicity determination include, for example, the use of zero crossings and the use of normalized autocorrelation functions (NACFs). In particular, using zero crossings and NACFs to detect periodicity is described in the aforementioned U.S. Pat. No. 5,911,128 and U.S. application Ser. No. 09/217,341. In addition, the above methods used to distinguish voiced speech from unvoiced speech are incorporated into the Telecommunication Industry Association Interim Standards TIA/EIA IS-127 and TIA/EIA IS-733. If the frame is determined to be unvoiced speech in step 408, the speech coder proceeds to step 410. In step 410 the speech coder encodes the frame as unvoiced speech. In one embodiment unvoiced speech frames are encoded at quarter rate, or 2.6 kbps. If in step 408 the frame is not determined to be unvoiced speech, the speech coder proceeds to step 412.

In step 412 the speech coder determines whether the frame is transitional speech, using periodicity detection methods that are known in the art, as described in, for example, the aforementioned U.S. Pat. No. 5,911,128. If the frame is determined to be transitional speech, the speech coder proceeds to step 414. In step 414 the frame is encoded as transition speech (i.e., transition from unvoiced speech to voiced speech). In one embodiment the transition speech frame is encoded in accordance with a multipulse interpolative coding method described in U.S. Pat. No. 6,260,017, entitled MULTIPULSE INTERPOLATIVE CODING OF TRANSITION SPEECH FRAMES, filed May 7, 1999, assigned to the assignee of the present invention, and fully incorporated herein by reference. In another embodiment the transition speech frame is encoded at full rate, or 13.2 kbps.

If in step 412 the speech coder determines that the frame is not transitional speech, the speech coder proceeds to step 416. In step 416 the speech coder encodes the frame as voiced speech. In one embodiment voiced speech frames may be encoded at half rate, or 6.2 kbps. It is also possible to encode voiced speech frames at full rate, or 13.2 kbps (or full rate, 8 kbps, in an 8 k CELP coder). Those skilled in the art would appreciate, however, that coding voiced frames at half rate allows the coder to save valuable bandwidth by exploiting the steady-state nature of voiced frames. Further, regardless of the rate used to encode the voiced speech, the voiced speech is advantageously coded using information from past frames, and. is hence said to be coded predictively.

Figure 6A:
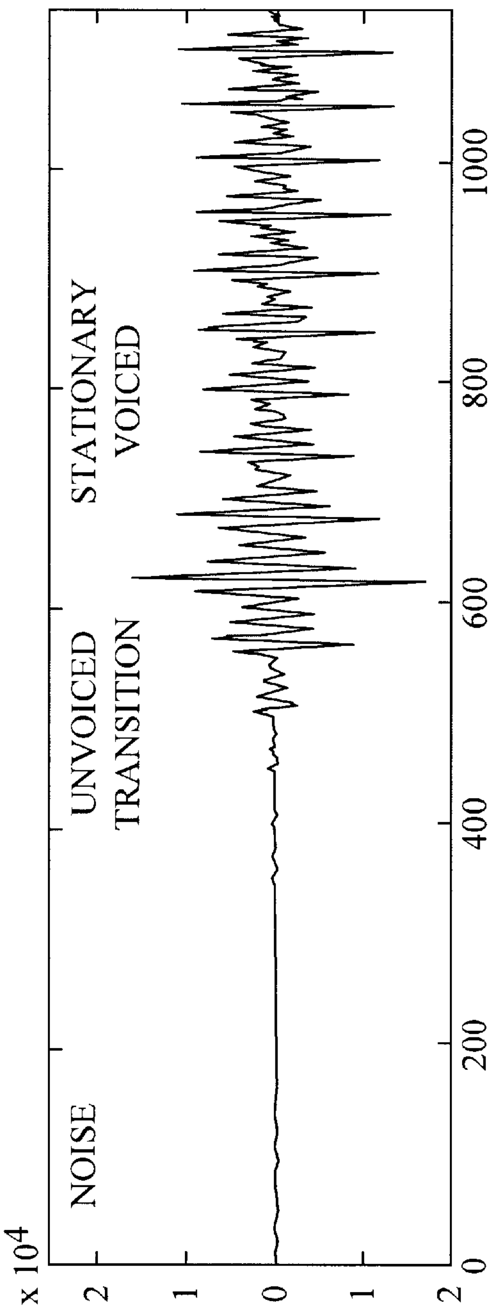
FIG. 6A PRIOR ART
FIG. 6A is a graph speech signal amplitude versus time.
Figure 6B:
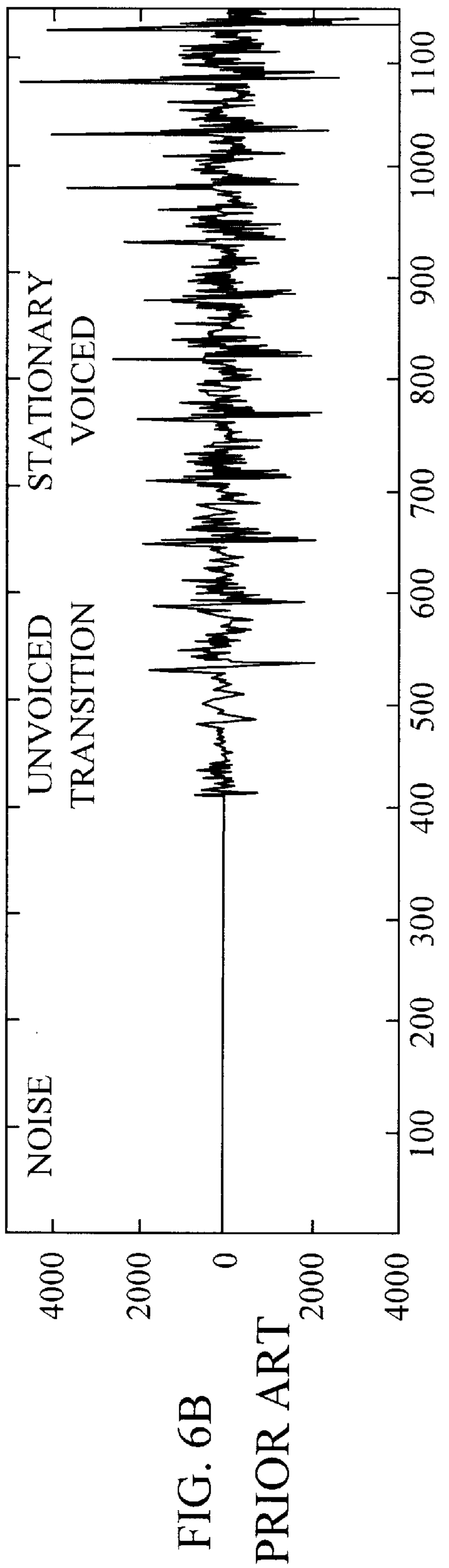
FIG. 6B PRIOR ART
FIG. 6B is a graph of linear prediction (LP) residue amplitude versus time.

Those of skill would appreciate that either the speech signal or the corresponding LP residue may be encoded by following the steps shown in FIG. 5. The waveform characteristics of noise, unvoiced, transition, and voiced speech can be seen as a function of time in the graph of FIG. 6A. The waveform characteristics of noise, unvoiced, transition, and voiced LP residue can be seen as a function of time in the graph of FIG. 6B.

Figure 7:
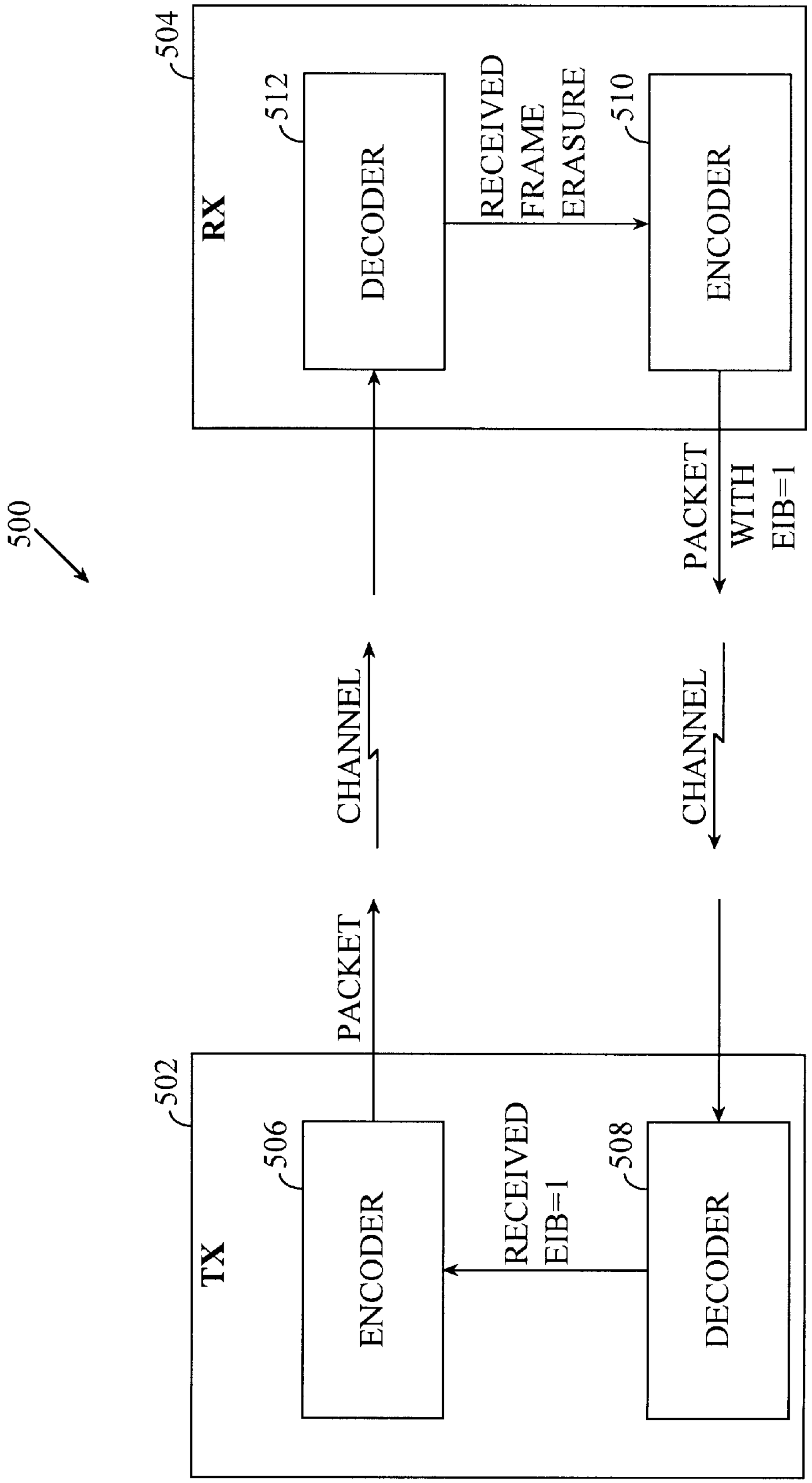
FIG. 7 is a block diagram of a speech coding system that uses a feedback loop from the decoder at the receiver to the encoder at the receiver, from the encoder at the receiver to the decoder at the transmitter, and from the decoder at the transmitter to the encoder at the transmitter.

In one embodiment a speech coding system 500 is configured to provide a feedback loop from the decoder at the receiver to the encoder at the receiver, from the encoder at the receiver to the decoder at the transmitter, and from the decoder at the transmitter to the encoder at the transmitter, as shown in FIG. 7. The feedback loop from the receiver decoder to the transmitter encoder advantageously enables the speech coding system 500 to improve performance under frame erasure conditions by avoiding propagation of bad frame memories, as described below.

The speech coding system 500 includes first and second speech coders 502,504. The first speech coder 502 is denoted the transmitter speech coder and the second speech coder 504 is denoted the receiver speech coder for purposes of explanation only. The first speech coder 502 includes an encoder 506 and a decoder 508. The second speech coder 504 includes an encoder 510 and a decoder 512. Either speech coder 502,504 may advantageously be implemented as part of a DSP, and may reside in, e.g., a subscriber unit or base station in a PCS or cellular telephone system, or in a subscriber unit or gateway in a satellite system.

The encoder 506 transmits a packet across a communication channel. The decoder 512 receives the packet. If a frame was lost during transmission (e.g., due to poor or noisy channel conditions), the decoder 512 sends a signal to the encoder 510 indicating that a frame erasure was received. The encoder 510 then sets the value of a particular bit, denoted the erasure indicator bit (EIB), to one on the next packet to be transmitted. The encoder 510 then transmits the packet. The packet is received by the decoder 508. The decoder 508 sends a signal to the encoder 506 indicating that a packet with the EIB set to one was received. Upon receiving the signal from the decoder 508, the encoder 506 sends a low-memory-encoded packet as the next packet. In a particular embodiment, the encoder 506 sends a memoryless-encoded packet as the next packet.

The speech coding system 500 is beneficial for the following reasons.

Typically, a relatively large amount of memory is used in predictive speech coders. Accordingly, each frame (in a particular embodiment, each frame is twenty ms long) when encoded uses information from past encoded frames. This affects the performance of the speech coder under frame erasure conditions. For example, if a frame (or multiple frames) get(s) erased, frames following the erasure suffer in quality in a prediction-based speech coder (which uses information from past frames to predict the current frame). This is especially true for low-bit-rate speech coders, in which where there is heavy prediction. However, in accordance with the above-described embodiments, when the receiver-side speech decoder 512 receives an erased frame, the decoder 512 sends feedback to the transmitter-side speech encoder 506 that the decoder 512 has seen an erasure, and thereby requests either a low-memory (minimum predictive) encoding or a memoryless (non-predictive) encoding to resynchronize the output and memories of the receiver-side speech decoder 512 with those of the transmitter-side speech encoder 506. Thus, as described above, the receiver-side speech decoder 512 notifies the receiver-side speech encoder 510 to send an EIB along with the next packet. The transmitter-side speech decoder 508 then informs the transmitter-side speech encoder 506 of the received EIB. The transmitter-side speech encoder 506 accordingly performs either a low-memory (minimum predictive) encoding or a memoryless (non-predictive) encoding, sending the corresponding packet to the receiver-side speech decoder 512. The receiver-side speech decoder 512 then decodes the low-memory or memoryless packet, using the decoded packet to reset or resynchronize its memories with those of the transmitter-side speech encoder 506. The maximum time the receiver-side speech decoder 512 will have to wait before receiving the low-memory or memoryless encoded packet is one frame duration (because the receiver-side encoder 510 may already have begun creation of a packet) plus another frame duration (because the transmitter-side encoder 506 may already have begun the creation of a packet when it receives the EIB) plus a one-way transmission delay time.

Thus, a novel method and apparatus for providing feedback from the decoder to the encoder to improve performance in a predictive speech coder under frame erasure conditions has been described. Those of skill in the art would understand that the various illustrative logical blocks and algorithm steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A speech coding system, comprising:

a first speech coder including a first encoder and a first decoder; and a second speech coder including a second encoder and a second decoder, wherein the first encoder is configured to encode packets of speech frames and transmit the packets across a communication channel to the second decoder, the second decoder is configured to receive and decode packets and to send a signal to the second encoder if a transmitted frame is not received by the second decoder, the second encoder is configured to encode and transmit packets and to modify a packet in response to the signal from the second decoder, the first decoder is configured to receive and decode packets and to send a signal to the first encoder upon receiving a modified packet from the second encoder, and the first encoder is further configured to encode a packet using a modified encoding format in response to the signal from the first decoder.

2. The speech coding system of claim 1, wherein the modified packet comprises a packet with an erasure indicator bit set to a digital value of one.

3. The speech coding system of claim 1, wherein the modified encoding format comprises a low-memory encoding scheme.

4. The speech coding system of claim 1, wherein the modified encoding format comprises a memoryless encoding scheme.

5. The speech coding system of claim 1, wherein the first speech coder resides in a subscriber unit and the second speech coder resides in a base station of a wireless communication system.

6. The speech coding system of claim 1, wherein the second speech coder resides in a subscriber unit and the first speech coder resides in a base station of a wireless communication system.

7. A method of providing feedback from a first decoder in a first speech coder to a first encoder in a second speech coder, comprising the steps of:

notifying a second encoder in the first speech coder if the first decoder fails to receive a frame transmitted by the first encoder;

transmitting a modified packet from the second encoder to the second decoder in response to the notification;

notifying the first encoder when the second decoder receives the modified packet from the second encoder; and encoding a packet at the first encoder with a modified encoding format.

8. The method of claim 7, wherein the modified packet comprises a packet with an erasure indicator bit set to a digital value of one.

9. The method of claim 7, wherein the modified encoding format comprises a low-memory encoding scheme.

10. The method of claim 7, wherein the modified encoding format comprises a memoryless encoding scheme.

11. The method of claim 7, wherein the first speech coder resides in a subscriber unit and the second speech coder resides in a base station of a wireless communication system.

12. The method of claim 7, wherein the second speech coder resides in a subscriber unit and the first speech coder resides in a base station of a wireless communication system.

13. A feedback mechanism in a speech coding system, the speech coding system including first and second speech coders, the first speech coder including a first encoder and a first decoder, the second speech coder including a second encoder and a second decoder, the feedback mechanism comprising:

means for notifying the second encoder if the second decoder fails to receive a frame transmitted by the first encoder;

means for transmitting a modified packet from the second encoder to the first decoder in response to the notification;

means for notifying the first encoder when the first decoder receives the modified packet from the second encoder; and means for encoding a packet at the first encoder with a modified encoding format.

14. The feedback mechanism of claim 13, wherein the modified packet comprises a packet with an erasure indicator bit set to a digital value of one.

15. The feedback mechanism of claim 13, wherein the modified encoding format comprises a low-memory encoding scheme.

16. The feedback mechanism of claim 13, wherein the modified encoding format comprises a memoryless encoding scheme.

17. The feedback mechanism of claim 13, wherein the first speech coder resides in a subscriber unit and the second speech coder resides in a base station of a wireless communication system.

18. The feedback mechanism of claim 13, wherein the second speech coder resides in a subscriber unit and the first speech coder resides in a base station of a wireless communication system.

* * * * *